United States Patent [19]

Trecker et al.

[11] Patent Number: 5,037,659
[45] Date of Patent: Aug. 6, 1991

[54] LOW FAT CHEESE BY EVAPORATION OF RETENTATE

[75] Inventors: Gary W. Trecker, Wheeling; Susan P. Monckton, Glen Ellyn; Brent K. Pope, Wildwood, all of Ill.

[73] Assignee: Kraft General Foods, Inc., Glenview, Ill.

[21] Appl. No.: 458,233

[22] Filed: Dec. 28, 1989

[51] Int. Cl.⁵ .................. A23C 19/05; A23C 19/02
[52] U.S. Cl. ........................... 426/40; 426/36; 426/582; 426/491
[58] Field of Search ............... 426/36, 40, 582, 491

[56] References Cited

U.S. PATENT DOCUMENTS

| | | | |
|---|---|---|---|
| 3,017,274 | 1/1962 | Dahlstrom | 426/40 |
| 3,156,568 | 11/1964 | Hargrove et al. | 426/40 |
| 4,476,143 | 10/1984 | Czulak et al. | 426/40 |
| 4,689,234 | 8/1987 | Ernstram et al. | 426/40 |
| 4,820,530 | 4/1989 | Moran et al. | 426/40 |

*Primary Examiner*—Marianne Cintins
*Attorney, Agent, or Firm*—Fitch, Even, Tabin & Flannery

[57] ABSTRACT

In accordance with the method of the present invention for manufacture of low-fat cheese from skim milk, the fat level of milk is adjusted to less than about 1 percent to provide the low fat milk utilized in the method. The low fat milk is subjected to membrane treatment to provide a retentate. A lactic acid-producing culture and a coagulating enzyme are added to the retentate. The coagulating enzyme is added in a coagulating amount. The retentate is then fermented while subjecting the retentate to movement sufficient to prevent formation of a coagulum and to form curd particles having a size in the range of from about 3 to about 22 microns. After fermentation, the retentate is evaporated under turbulent conditions to provide a low-fat cheese having at least of about 50 percent solids.

13 Claims, No Drawings

LOW FAT CHEESE BY EVAPORATION OF RETENTATE

The present invention relates generally to the manufacture of curd and cheese from low fat milk and, more particularly relates to a process for the manufacture of cheese from skim milk retentate which are evaporated.

BACKGROUND OF THE INVENTION

The manufacture of cheese from milk through preparation of a retentate by membrane processes, such as ultrafiltration and diafiltration, by removal of salts, lactose, and water has been taught in various patents and literature references. From the large variety of methods and procedures which have been proposed for the manufacture of cheese from retentates, it is apparent that the physical chemistry of milk is complex and the interactions between the protein, fat, salts and other components of milk are vastly altered by creation of the retentate. It is also apparent that methods and procedures which have been proposed for treatment of a retentate prepared from one form of milk are not predictably usable when other forms of milk, and other procedures are used to prepare a retentate. For example, some procedures, such as disclosed in U.S. Pat. No. 4,820,530 and U.S. patent application Ser. No. 649,838, filed on Sept. 11, 1984, both to Moran, et al. disclose the desirability of preventing coagulation from occurring when the retentate is fermented.

PCT application Ser. No. W082/01806 of Schrieber Foods, Inc. discloses a process which permits evaporation of water from fermented retentate. The process includes four steps: (1) selective concentration of milk to form a retentate; (2) increasing the ionic strength of the retentate by the addition of a salt, such as sodium chloride, so as to maintain it in the liquid phase during fermentation; (3) fermenting the retentates and (4) removing water from the fermented retentate to produce cheese or cheese base containing substantially all the casein and whey proteins originally present in the milk. The PCT application also discloses the use of rennet, which may be added to the retentate substantially prior to evaporation, such as at the same time as the lactic acid producing bacteria.

A patent to Coulter, et al., entitled "Cheese Manufacture from Molecular Sieved Milk," issued Oct. 26, 1976, U.S. Pat. No. 3,988,481, teaches the preparation of cheese from milk which has been de-lactosed and de-watered by a process involving molecular sieving a standardized milk to substantially separate and remove lactose and water-soluble minerals from the milk to render the milk substantially sugar-free, and adding a curd-forming agent to produce curd. The resulting curd is subjected to conventional handling without substantial syneresis to produce a cheese and is molded to a desired form.

A patent to Stenne, entitled "Method for the Manufacture of Cheeses," issued Aug. 12, 1975, U.S. Pat. No. 3,899,596, discloses a process for the production of cheese which comprises treating milk by ultrafiltration to obtain a product having at least some of the protein constituents of the milk, renneting the liquid product after inoculation with suitable ferments, and introducing a batch of the renneted liquid into a vertical chamber in which it is left to coagulate. The coagulum is cut into slabs which provide the end product cheese.

A patent to Maubois, et al., entitled "Manufacture of Cheese from Ultrafiltered Milk," issued Oct. 21, 1975, U.S. Pat. No. 3,914,435, teaches cheese made from heat-treated milk and without conventional draining of whey by a process which involves ultrafiltering of the milk to produce a concentrate having essentially the composition of cheese produced by conventional whey draining processes. The process enables the milk, after ultrafiltration, to be heat-treated without making the milk more difficult to coagulate with rennet, which difficulty normally occurs when milk is heated to high temperatures.

A patent issued to Wargel, et al., entitled "Process and Products from the Manufacture of Cheese-flavored Products," issued June 13, 1981, U.S. Pat. No. 4,244,971, teaches the manufacture of cheeses and process cheese, from ultrafiltered milk.

A patent entitled "Process for Preparing Cheese base," issued Aug. 30, 1983, to Rubin, et al., U.S. Pat. No. 4,401,679, discloses a process for preparing cheese base by concentrating milk through ultrafiltration combines with diafiltration and evaporation, wherein the retentate from the ultrafiltration is inoculated with an acid culture before evaporation, and after evaporation acidification proceeds to completion after packing.

Further, cheese base material has been taught by evaporating moisture from retentate under turbulent conditions to provide a lower moisture condition. Such a process is described in an article by Ernstrom, et al., entitled "Cheese base for Processing: A High-yield Product from Whole Milk by Ultrafiltration," published in the *Journal of Dairy Science*, volume 63, 223–234 (1980). The article teaches a process wherein whole milk of normal pH, or acidified to a pH of 5.7, is concentrated by ultrafiltration to about 40 percent of the original milk weight and diafiltered at constant volume until a desired ratio of lactose to buffer capacity is established. The retentate is then further concentrated by ultrafiltration to 20 percent of the original milk weight. The retentate is then inoculated with cheese starter and incubated to completely ferment the residual lactose, pH control being achieved by controlling the level of lactose from the diafiltration step of the process. The product is further concentrated in a swept-surface vacuum-pan evaporator or a Luwa evaporator. It is pointed out in the article that the use of a batch evaporator is necessitated when the retentate, upon fermentation, curdles or coagulates, since such a product cannot be readily processed in any continuous-flow evaporator.

It is known to add salt during fermentation to prevent coagulation and this was understood many years ago. See: LeLait/November-December, 1974No. 539/540. Further, it has been disclosed that salt in the retentate may facilitate evaporation as disclosed in an Australian application, which is the subject of a published application under the Patent Cooperation Treaty W032/01306, published June 10, 1982.

The prior art specifically teaches that addition of rennet or other coagulating enzymes to high-solids milk systems causes rapid coagulation and is a condition to be avoided during evaporation, since the evaporation is said to be highly inefficient after coagulation occurs. On the other hand, the presence of coagulating enzymes may be desired, particularly in higher-solids cheese, to provide the conventional presence of para kappa casein by cleavage of kappa casein. The kinetics of enzymatic coagulation of milk is disclosed by Alfred Carlson, in a thesis published in 1982, at the University of Wisconsin, entitled "The Kinetics of Enzymatic Coagulation of Milk."

In the conventional making of cheese with rennet, the macro peptides formed by rennet action are lost in the whey with consequent reduction in yield and loss of nutritious milk protein material. Accordingly, it would be desirable to enjoy the benefit of rennet action while avoiding whey removal with consequent loss of macro peptides.

Further, prior art methods for making cheese base materials at higher-solids with evaporation, in which evaporation is effected with high turbulence or the cheese base material is recovered with substantial working after evaporation, has resulted in destabilization of the higher-solids cheese base material, and a body and texture unlike various known cheeses. This destabilization is particularly noticeable at total solids in excess of about 60% to 62%, e.g., a cheese such as Cheddar cheese, but is also present at solids as low as 55 percent. Accordingly, cheese base materials heretofor produced by evaporating retentates to a total solids in excess of 60 percent have not provided the typical body and texture characteristics of known high-solids cheeses.

In addition, the use of high turbulence throughout evaporation or working after evaporation does not provide a product having a likeness to curd. Prior art methods for making cheese from retentates with evaporation techniques do not disclose a method for making a curd-like product.

The prior art teaches many different steps in respect to the manufacture of cheeses and cheese base materials from milk retentates. Evaporation of milk retentates is a previously known technique, but the resultant product does not have curd character, nor does it convert to a product having the body and texture of cheese. Also, much of the prior art is directed toward the manufacture of higher moisture or soft cheeses, and it has not been directed toward the production of high-solids cheeses from retentates by means of evaporation of retentates. The difficulty which occurs with turbulence at higher-solids, i.e., above 55 percent total solids, is that the product destabilizes and exudes fat, and high-solids product, i.e., above 60 percent total solids, does not have the characteristic cheese body and texture. If the moisture is high enough, fat exudation can be avoided and the body and texture of soft cheeses can be provided.

The use of skim milk, i.e., a milk having less than 1.0 percent fat, after being processed to a retentate has not been effectively evaporated in swept surface evaporators to a solids content in excess of 45 percent by known technology because of binding of the rotors in such evaporators. Thus, the known technology did not provide effective means for making skim milk cheeses, i.e., cheeses having less than 16 percent fat. Such low-fat cheeses are particularly desired for the manufacture of processed cheeses because of a consumer desire for healthful diet alternatives and their manufacture by ultra filtration and evaporation methods would provide great advantages.

Accordingly, despite the many teachings of the prior art relating to the manufacture of cheese base material and cheese from retentates derived from milk with evaporation thereof there has been a lack of an efficient process for producing cheese from skim milk utilizing a retentate produced by membrane techniques.

It is a principal object of this invention to provide a curd and/or cheese from a low-fat or skim milk retentate by means of evaporation, the curd and/or cheese having a solids content of more than 50 percent.

A further object of this invention is to provide cheese from low fat milk which is stable and does not oil-off, and is manufactured by processing a low-fat milk retentate with evaporation in a swept surface evaporator.

Another object of this invention is to provide a cheese from low-fat milk which has substantial formation of para kappa casein but which may be utilized in a process using continuous, swept surface evaporation and equipment.

Still further objects and advantages of the invention will become apparent by reference to the following description.

SUMMARY OF THE INVENTION

In accordance with the method of the present invention curd and/or cheese is manufactured from skim milk, the fat level of the milk being adjusted to less than about 1.0 percent, to provide a curd and/or cheese having more than 50 percent solids and about 15% fat, dry basis. The low fat milk is subjected to ultrafiltration treatment to provide a retentate. A lactic acid-producing culture is added to the retentate as well as a coagulating enzyme. The retentate is subjected to movement sufficient to prevent formation of a coagulum. After fermentation, the retentate is evaporated under turbulent conditions to provide a skim milk cheese having at least of about 50 percent solids.

DETAILED DESCRIPTION OF THE INVENTION

In accordance with the present invention, it is preferred to start the method of the invention with fresh whole milk. The milk is standardized to provide a desired low fat level by conventional centrifugal separation procedures. It is generally desirable to have a fat level of less than about one percent, and preferably from about 0.6 percent, to about 0.8 percent. All percentages used herein are by weight, unless otherwise indicated. The protein/fat ratio is preferably from about 4.3 to about 5.2. Of course, the standardized milk could be provided through use of non-fat milk solids which are dissolved in water to the desired fat level and protein/fat ratio. The standardized milk is then pasteurized in accordance with conventional pasteurization conditions, such as by heating to a temperature of 161° F. for 16 seconds.

The low fat milk is then treated by known ultrafiltration processes or the equivalent to provide a retentate having between about 74 percent and about 82 percent moisture; between about 1.2 percent and about 1.8 percent ash, between about 12 percent and about 20 percent protein; between about 0.8 percent and about 1.4 percent lactose and from between about 2.2 percent and about 3.5 percent fat.

Various techniques are known in the art for achieving the indicated retentates, for example ultrafiltration, with or without diafiltration. Commercial apparatus is marketed and available for the preparation of such retentates, and the apparatus is in present use in the cheese industry. The operation of such apparatus is believed to be within the skill of the art. Preferably, in the practice of the invention, the milk is treated by ultrafiltration and diafiltration to provide the desired level of constituents in the retentate.

The total solids of the retentate should not be so high as to result in gelation of the retentate during processing and it has been found that the total solids content of the retentate made from skim milk should be between about 18 percent and about 22 percent.

The retentate is then placed in a fermentation tank and mixed with conventional cheese cultures or starters, such as, for example, those commercially available and normally used in the manufacture of American-type and other cheeses. Examples of such cultures or starters are *Streptococcus lactis*, *Streptococcus cremoris*, *Lactobacillus bulgaricus* and *Lactobacillus lactis* and other well known microorganisms. The term American-type cheese is meant to include Cheddar cheese. The retentate may have enzymes added to enhance flavor in the end product, such as certain lipases and proteases which hydrolyze fat and protein in the retentate. The enzymes also serve to reduce viscosity in the system which serves to avoid gelation in the process. These enzymes are also known to the cheese industry and their addition as been previously disclosed in the manufacture of cheese.

The retentate is also mixed with a milk clotting enzyme commonly used in cheese manufacture and widely available commercially. Perhaps the best known coagulating enzyme in cheese making is veal rennet. However, a number of other milk clotting enzymes are known in the cheese industry, as for example, microbial rennets, such as *Mucor meheii*. These enzymes are known to cause conversion of kappa casein to para kappa casein in cheese by their action upon kappa casein in the milk. Equivalents to these well known milk clotting enzymes can be utilized if they effect the conversion of kappa casein like the milk clotting enzymes. In conventional cheese making, the coagulating enzymes cause clotting of milk to form a coagulum with substantially all of the para kappa casein being formed in the vat coincident with the setting of the milk. Also, the milk clotting enzymes form macro peptides which, in conventional cheese manufacture, are removed with the whey. When the milk solids are increased, the prior art teaches more rapid coagulation and formation of para kappa casein.

The milk clotting enzyme is added to the retentate at a level which would be sufficient to cause a coagulum to form if the retentate is maintained in a quiescent condition. The milk clotting enzyme is also added at a level sufficient to convert substantially all of the kappa casein to para kappa casein prior to further processing. The preferred method uses enzyme equivalent to, such as for example, 0.01% single strength rennet in the final cheese calculated at 51% total solids, to provide a sufficient quantity of the milk coagulating enzyme. The mix is held for sufficient time to effect substantial conversion to para kappa casein; e.g. preferably greater than 90% conversion.

While the coagulating enzyme must be added at a level sufficient to cause a coagulum in order to attain the proper conversion of kappa casein to para kappa casein, it is an important aspect of the present invention that a coagulum is prevented from being formed. In this connection, it has been determined that the retentate can be maintained in a fluid state without formation of a coagulum during the fermentation step if the retentate is subjected to total movement during fermentation to prevent coagulum. In this connection, vigorous agitation alone will not prevent a coagulum from occurring. Many areas, such as "dead spots" along the agitator shaft, support bars and behind the baffle plate are susceptible to localized formation of coagulum. Two suitable methods have been devised to eliminate coagulation.

In the first approach, continuous agitation is used in combination with continuous recirculation of the retentate from the bottom of the fermentation tank back to the top of the retentate in the fermentation tank. The continuous agitation can be provided by the rotating bar of a Walker kettle which is operated at a speed of from about 15 to about 17 rpm. A recirculation rate of from about 0.01 to about 10 gallons per minute per gallon of retentate in the fermentation tank is suitable for prevention of formation of a coagulum.

In a second preferred method for avoiding coagulum formation during fermentation, a primary and secondary means for movement of the retentate in the fermentation tank is provided. The primary means for movement is that provided by a commercially available Walker kettle. The primary means of agitation is a rotating bar which is mounted on a shaft and which rotates at the bottom of the kettle, preferably at a speed of from about 10 to about 30 rpm. The bar is shaped to fit the contour of the kettle bottom. The secondary means of agitation is a helical screw-type agitator which is mounted vertically in the fermentation tank in a position proximate and substantially parallel to the shaft of the primary agitation means. The helical screw agitator is preferably operated at a speed of from about 20 to about 150 rpm. The combination of primary/secondary agitation is extremely effective to prevent a coagulum from forming during the fermentation.

Fermentation and agitation of the retentate is continued until the acid in the retentate has lowered the pH to the range of between about 4.8 and about 5.4. The pH can be controlled by controlling the lactose level in the retentate. Stated another way, the cheese cultures serve to convert the lactose to lactic acid, thereby increasing the acid and lowering the pH. Again, it is important that the fermentation be controlled in such a manner as to prevent formation of a coagulum The addition of the coagulating enzyme with the agitation in accordance with the invention causes formation of particulate curd. Such particulate curd should have a particle size of between about 3 and about 22 microns. By formation of this particulate curd, the swept surface evaporator used for evaporation achieves greatly increased efficiencies and binding of the rotors is avoided. This discovery in respect to the utilization of particulate curd overcomes the heretofore experienced problem of use of swept surface evaporators for producing high solids, low-fat cheese products.

At fermentation temperatures greater than about 75° F. a significant amount of settling out of cheese particles, which are precipitated protein, occurs. The use of fermentation temperatures in the range of from about 68° F. to about 72° F. greatly minimizes precipitation of protein and formation of cheese particles. At the end of the fermentation period, the retentate is in a fluid condition and a coagulum has not formed. The retentate is then ready for swept surface evaporation at high efficiency to provide low-fat cheese in accordance with the invention.

Evaporation is effected with highly turbulent conditions occurring throughout water removal. This is preferably accomplished by the use of a commercially available evaporator, such as a Turba-Film evaporator or a Luwa evaporator. Evaporation is effected to provide an evaporated product having from about 50 to about 58 percent solids by weight.

During evaporation, it is desirable that the temperature of the fermented retentate does not exceed about 85° F. Preferably, the evaporated retentate is discharged from the evaporator at a temperature of from about 75° F. to about 85° F., and most preferably at a temperature below about 80° F. Immediately after evaporation, the product of the invention is sufficiently flowable to permit packaging of the low-fat cheese in suitable containers.

While not wishing to be bound to a particular theory, it is believed that the addition of a milk-clotting enzyme during fermentation results in the enzymatic cleavage of Kappa (>90% conversion to a para-Kappa casein). It is believed that the constant agitation applied during the fermentation step provides the driving force required to prevent a gel network from forming, resulting in nearly complete syneresis within the retentate. The casein is aggregated into dense particles (up to 22 microns), suspended within the fat/moisture phase of the retentate.

Subsequent to the evaporation step, the evaporated product provides a cheese having a texture which is soft, smooth, and fat stable in appearance.

It is believed that the higher solids potential, during evaporation is achievable due to the prevention of the formation of a three dimensional casein network; the moisture phase is not entrapped and is readily available for evaporation.

The low-fat skim milk cheese product of the present invention is highly suitable for preparation of low-fat process cheeses, such as low fat cheese slices. In this connection, the cheese product of the present invention can be used by itself to provide a low fat cheese slice or can be mixed with from about 25 percent to about 75 percent by weight of natural cheese, such as American cheese and Swiss cheese, to provide a process cheese product that is highly satisfactory.

The following examples illustrate various features of the present invention but are intended to in no way limit the scope of the invention which is defined in the appended claims.

EXAMPLE I

Fresh whole milk was standardized to a 4.46 protein/fat ratio with 0.70 percent fat and 3.12 percent protein, and then high temperature, short time (HTST) plate pasteurized at 161° F. for 16 seconds.

A Dorr-Oliver ultrafiltration system was used in a batch processing mode to obtain a retentate having 1.0 percent lactose and 21.5 percent total solids, i.e. a 5-fold concentration. Diafiltration was accomplished in two separate steps by washing the retentate with 0.77 and 0.67 parts water (40 and 35 gallons of water to 52 gallons of retentate at approximately 24 percent total solids). The retentate was then high temperature, short time pasteurized at 165° F. for 16 seconds with subsequent cooling to a temperature of 68°-70° F. The retentate was then removed to a Walker kettle provided with a secondary helical screw-type agitator mounted parallel to the shaft for the primary rotating bar. The primary mixer was turned on and operated at a speed of 15.75 rpm and the secondary helical mixer was turned on and operated at a speed of 150 rpm. A 22 percent salt solution was added to yield 1.2 percent calculated salt content in the finished skim curd cheese when evaporated to 57 percent total solids. A DVS lactic starter was added at a rate of 0.24ml per pound of retentate. New Marzyme coagulant C enzyme (1 to 10 solution) was added at a rate to yield a 0.011 percent calculated level of enzyme in the 57 percent total solids skim milk retentate.

Fermentation was allowed to proceed overnight at a temperature of 72° F. with total agitation of the retentate by means of the primary and secondary mixers. The total fermentation time was 16 hours. After fermentation, substantially 100 percent of kappa casein had been converted to para kappa casein. At the conclusion of the fermentation period the particles of curd were in the size range of from about 3 to about 22 microns.

The fermented retentate was then evaporated to a total solids level of 57 percent in a Turba Film evaporator which was operated at a rotor speed of 270 rpm, a steam temperature (in/out), of 150°/140° F., a vapor pressure of 18 mm and a product discharge temperature of 80° F.

The product exiting from the evaporator had a smooth, non-oily appearance which was not too thick or sticky. When cooled, the low fat skim milk cheese product of the invention was successfully used as a 100 percent and 50 percent replacement of conventional skim cheese used in the manufacture of a sliced process cheese product on a chill roll. The chill roll production of the cheese slices resulted in good machinability with 50 percent replacement and resulted in some slice breakage occurring at the 100 percent replacement level. An organoleptic evaluation indicated that the skim milk cheese produced in accordance with the present invention was comparable to the control slices made with conventional skim cheese.

EXAMPLE II

Fresh whole milk was standardized to a Protein/Fat ratio of 5.0. The milk was checked on the Milk-O-Scan (Foss infrared protein and fat analyzer) after skimming to assure accuracy. (Addition of cream or nonfat milk would be necessary if adjustment were needed.) The milk was pasteurized at 161° F. for 16 seconds.

An Abcor spiral wound 6 stage ultrafiltration system was used to continuously concentrate the milk. The first 4 stages were used for concentration and the last 2 stages were used for diafiltration. Water in the final stage was adjusted to yield 0.9% lactose in the final retentate. Retentate was concentrated to 21.5% total solids and then pasteurized again at 161° F. for 16 seconds. Following pasteurization the retentate was cooled to 70° F. and 7500 lbs. of the retentate were pumped into a 1000 gallon commercially available Walker kettle type of fermentation tank.

The scraped surface agitator of the fermentation tank was set at 18 rpm. A pump was connected to the bottom outlet of the tank to recirculate the retentate during fermentation. The flow rate was set at 8 gal./min. to produce turbulence throughout the retentate, eliminating "dead spots" and thereby preventing a coagulum from forming.

Salt was mixed with water to form a 22% brine solution. This brine was added to yield a cheese with 1.4% salt in the final cheese based on 51% solids in the cheese. A lactic culture was added to the cheese at the rate of 240 ml. culture per 1000 lbs. of 22% solids retentate. Double strength New Marzyme coagulant was added at the rate of 11 ml. per 1000 lbs. of 22% solids retentate.

Fermentation was allowed to proceed overnight at a temperature of 71° F. Total fermentation time was approximately 11 hours. At the end of fermentation about 90% of the K-casein was converted to p-k-casein.

Some small cheese fines were present in the bottom of the fermentation tank and were clumped around the agitator shaft. These were pumped through a shear pump to reduce their size and produce a homogenous fluid for evaporation into cheese.

The fermented retentate was evaporated in a swept surface Turba-film evaporator to a total solids level of approximately 51% total solids. The feed temperature was 70° F. and product was pumped at a feed rate of approximately 25 lbs./min. Steam supply temperature of the Turba-film was 160° F. ± 3° F. and the vapor temperature was 79° F. ± 3° F. A vapor pressure of 23-28 mm Hg. resulted in product discharge temperatures between 76° F. and 82° F.

The resultant cheese was similar in appearance, flavor, and was used in the manufacture of process cheese in a similar fashion to the cheese produced in Example I.

What is claimed is:

1. A method for manufacture of cheese from skim milk comprising
   (a) adjusting the fat level of milk to less than about 1 percent to provide skim milk;
   (b) subjecting said skim milk to membrane treatment to provide a retentate and placing said retentate in a fermentation tank;
   (c) adding lactic acid producing cultures and a coagulating enzyme to said retentate, said coagulating enzyme being added in an amount that would cause a coagulum to form if said retentate were maintained in a quiescent condition;
   (d) fermenting said retentate while subjecting said retentate to movement sufficient to prevent formation of a coagulum; and
   (e) evaporating said fermented retentate under turbulent conditions to provide a skim milk cheese.

2. A method in accordance with claim 1 wherein said movement in step (d) is sufficient to form curd particles having an average particle size in the range of from about 3 to about 22 microns.

3. A method in accordance with claim 1 wherein said movement in step (d) is effected by agitating said retentate with a mechanical mixer while simultaneously recirculating retentate from the bottom of said fermentation tank onto the top of said retentate.

4. A method in accordance with claim 3 wherein said recirculation rate is from about 0.01 to 10 gallons per minute per gallon of retentate in said fermentation tank.

5. A method in accordance with claim 1 wherein said movement in step (d) is effected by use of a primary rotating bar mixer in combination with the use of a secondary helical screw mixer.

6. A method in accordance with claim 5 wherein said primary mixer is operated at a speed of from about 10 to about 30 rpm and said secondary mixer is operated at a speed of from about 20 to about 150 rpm.

7. A method in accordance with claim 1 wherein said fermentation takes place at a temperature of less than about 75° F.

8. A method in accordance with claim 1 wherein said retentate is maintained at a temperature of from about 68° F. to about 72° F. during fermentation.

9. A method in accordance with claim 1 wherein said evaporation of said retentate is sufficient to provide an evaporated retentate having from about 50 to about 58 percent solids by weight.

10. A method in accordance with claim 1 wherein the temperature of said fermented retentate does not exceed about 85 ° F. during said evaporation step.

11. A method in accordance with Claim 1 wherein said evaporated retentate is discharged from the evaporator at a temperature of from about 75° F. to about 85° F.

12. A process cheese comprising from about 25 to about 75 percent by weight of the skim milk cheese produced by the method of claim 1 and from about 75 percent to about 25 percent by weight of natural cheese.

13. A process cheese prepared from the skim milk cheese of claim 1.

* * * * *